United States Patent

Fuller

[11] 4,027,824
[45] June 7, 1977

[54] NUT GRINDING MILL
[75] Inventor: Don W. Fuller, Louisville, Ky.
[73] Assignee: Grindmaster of Kentucky, Incorporated, Louisville, Ky.
[22] Filed: June 7, 1976
[21] Appl. No.: 693,494
[52] U.S. Cl. .................. 241/152 A; 241/247; 241/260.1
[51] Int. Cl.² .................................. B02C 19/22
[58] Field of Search .......... 241/152 A, 246, 247, 241/260.1

[56] References Cited

UNITED STATES PATENTS

| | | | |
|---|---|---|---|
| 2,446,073 | 7/1948 | Bjorklund | 241/260.1 |
| 2,468,613 | 4/1949 | Bjorklund | 241/260.1 |
| R16,046 | 4/1925 | Greene | 241/247 |

Primary Examiner—Granville Y. Custer, Jr.
Attorney, Agent, or Firm—Arthur F. Robert

[57] ABSTRACT

A nut grinder of the type having: a front grinding chamber containing a rear inlet; a rear feeding chamber containing an upper downwardly-open hopper terminating in a lower upwardly-open trough having a front end outlet opening; a fluted tunnel connecting the front outlet opening of said trough with the rear inlet opening of the grinding chamber; a grinder in the grinding chamber including a rotatable grinding element; and a motorized screw conveyor extending through the trough and fluted tunnel and connected to drive the rotatable grinding element for nut grinding purposes. That portion of the screw conveyor, underlying the hopper, is provided with L-shaped cuts in its spiral turns at spaced 180° intervals. The leg of each L-shaped cut extends tangentially to the spiral screw conveyor at or adjacent the base of its spiral flights while the foot of the L extends radially and preferably leans forwardly in the direction of rotation. These cuts provide space accommodating the larger nuts while the foot of each cut propels nuts rotationally forward and compresses them against the casing wall sufficiently to break the nuts into smaller pieces which are readily conveyed by the screw conveyor. In other words, the larger nuts are broken up and fed forwardly into and through the tunnel into the grinder.

4 Claims, 5 Drawing Figures

NUT GRINDING MILL

CROSS REFERENCES TO RELATED APPLICATIONS

There are none.

BACKGROUND OF THE INVENTION

1. Field of the Invention

This invention relates to devices for grinding nuts into butter, viz: peanuts into peanut butter; almonds into almond butter; etc.

2. Description Of The Prior Art

The Greene U.S. Pat. No. Re. 16,046 granted Apr. 21, 1925 discloses a nut grinder or nut mill having the feeding, conveying and grinding structure described in the Abstract Of The Disclosure except that it does not disclose or suggest any cuts in the spiral turns of the conveyor. Greene's device is effective to grind up the smaller nuts. However, as the nuts fed to the conveyor increase in size, they ultimately become of sizes too larage to be accommodated by the screw conveyor. Such nuts simply accumulate over and roll and toss on the top side of the screw conveyor without being broken up and fed forwardly. Nut mills of this type have been provided with square channel-like cuts in the spirals. While these may alleviate the problem somewhat, they do not solve it because the larger nuts continue to accumulate, roll and toss on the top side of the screw conveyor.

SUMMARY OF THE INVENTION

Objects Of The Invention

The principal object of the invention is to provide means for breaking up nuts of all sizes as they reach the conveyor, feed them forwardly through the tunnel and grind them in the grinding chamber.

Another important object is to accomplish the foregoing objective in a simple, inexpensive and rapid manner.

Statement Of The Invention

I have found that the aforesaid nut mill can be made effective to grind all of the larger nuts simply by providing the spiral turns of the screw conveyor with L-shaped cuts at spaced intervals. These cuts may be restricted to that portion of the conveyor which underlies the bottom of the hopper feed chamber. The L-shaped cuts have a leg tangential to the conveyor at or adjacent the base of its spirals and a radial foot arranged so that the angle formed by the L opens obliquely in the direction of rotation. The cuts provide enough space to accommodate the larger nuts to an extent sufficient for the foot portion of the L to engage a nut and press and crack it against the wall of the grinder casing. Consequently, all of the large nuts are subjected continuously to cracking operations which reduce their size sufficiently to enable the screw conveyor to feed them into and convey them through the tunnel which discharges them into the grinder. To facilitate the cracking operation, the foot of the L preferably is undercut or slanted obliquely forward in the direction of rotation so as to sharpen its outer end which facilitates the penetration and cracking of all large nuts.

BRIEF DESCRIPTION OF THE DRAWINGS

The invention is illustrated in the accompanying drawings wherein.

DESCRIPTION OF THE PREFERRED EMBODIMENT

Figure 1:
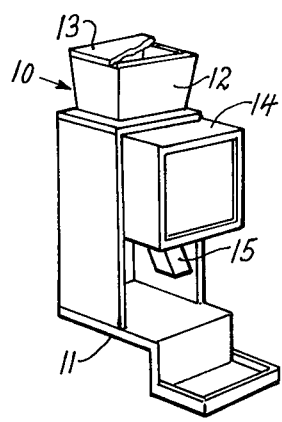
FIG. 1 is a small scaled perspective view showing a peanut butter mill constructed in accordance with my invention.

The unit shown in FIG. 1 includes: a housng 10 having a base ll; a hopper 12 which projects upwardly from and also downwardly into the housing 10; a hinged cover 13 over the upper end of the hopper 12; a cabinet 14 over the upper portion of the front face of the housing 10, this cabinet extending the housing face forwardly; and a spout 15 for discharging peanut butter into a suitable receptacle resting on base 11.

Figure 2:
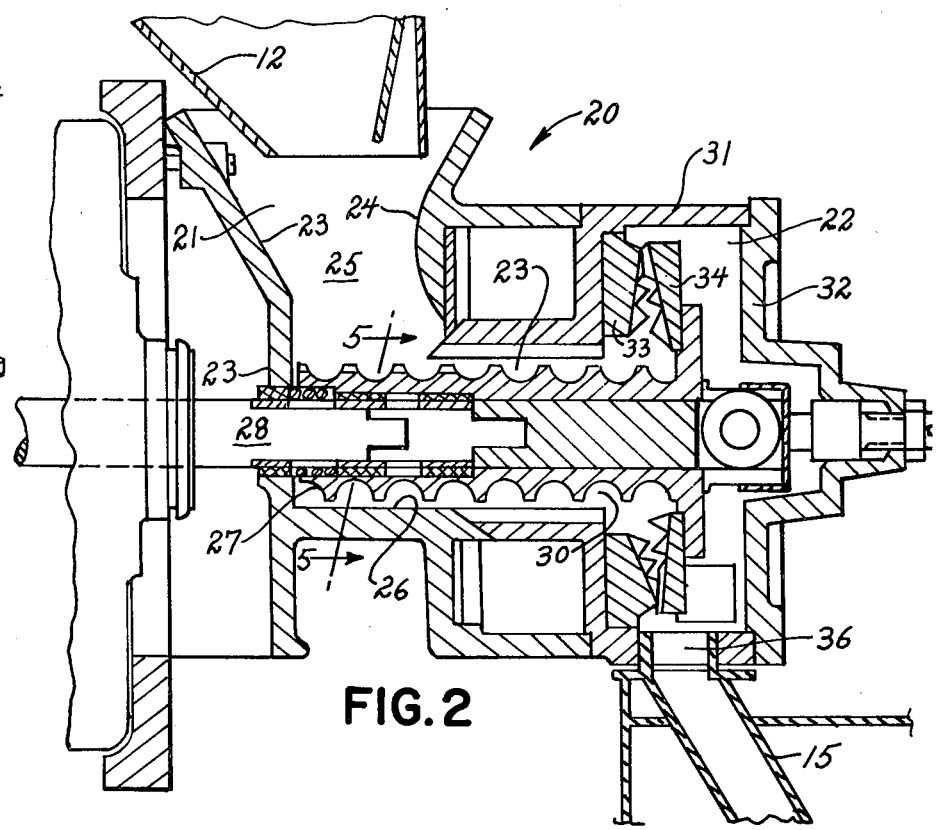
FIG. 2 is an enlarged fragmentary central section taken vertically through the longitudinal axial center of the nut mill.
Figure 4:
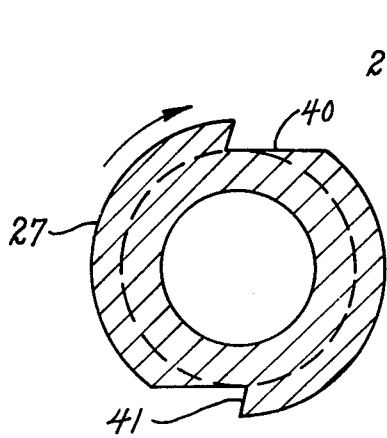
FIG. 4 is a section taken along line 4—4 of FIG. 3.
Figure 3:
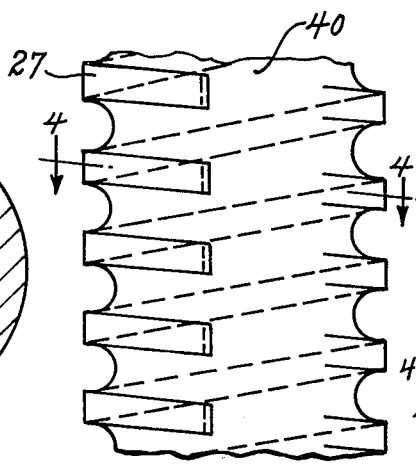
FIG. 3 is a fragmentary enlarged plan view of a portion of the spiral screw conveyor showing the L-shaped cuts.

As seen in FIG. 2, which omits much of the housing 10, the hopper 12 discharges downwardly through its bottom opening into a grinder 20 which is characterized by a rear feeding chamber 21 and a front grinding chamber 22 and a fluted tunnel 23 therebetween.

Figure 5:
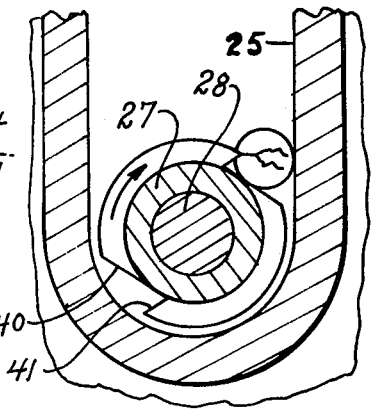
FIG. 5 is an enlarged section taken along line 5—5 of FIG. 2 with one nut between the casing wall and the outer end of the foot, this view omitting any illustration of the entrance to the fluted tunnel section.

The rear feeding chamber 21 has rear and front vertical walls 23 and 24, opposite side walls 25 and bottom wall 26 cooperating to form an upper funnel and a lower trough, which is best seen in FIG. 5. The upper funnel, which receives peanuts through its upper end, converges downwardly to discharge peanuts through its lower open end into the lower trough, which is U-shaped in transverse cross-section and open along its top. The trough contains a screw conveyor 27 which is driven by motorized shaft 28 extending through a rear wall 23 and which functions to feed peanuts longitudinally forward through the fluted tunnel into the front grinding chamber 22.

The front grinding chamber 22 has a centrally disposed peanut receiving inlet opening 30 in its rear wall, a peripheral wall 31 and a front wall 32 in the form of an end cap closing the front face of the grinding chamber. Peanuts, passing into the front grinding chamber 22, are forced to move radially outward into the annular inlet space between the stationary and rotary grinding discs 33 and 34 which converge outwardly. The resulting peanut butter is discharaged radially from the periphery of the disc grinders 33, 34 into the grinding chamber proper and ultimately forced successively through the bottom discharge opening 36 and spout 15 into a suitable container.

Normally the foregoing structure, as described, operates very nicely with small peanuts. With larger nuts, the screw conveyor is unable to break them up or to feed them forwardly into the tunnel. Hence, they simply roll and toss in the space along the top side of the trough-like conveyor section.

In accordance with my invention, the spirals of the feed worm or conveyor are provided with cuts which are L-shaped in contour to break up the nuts of larger size. Thus each cut has a tangential leg 40 and a radial foot 41. These cuts are spaced at suitable intervals along the spiral. I have obtained excellent results with the cuts at 180° intervals.

The tangential leg and radial foot of the L provide a V-shaped opening which opens obliquely forward in the direction of rotation. Preferably, the foot of the L is undercut or sloped forwardly in a manner such that its outer end provides a pointed edge which tends to cut into the larger nuts, propel them rotationally forward and ultimately break them by jamming them against the side wall 25. Some nuts may be subjected to repeated cutting along the top side of the spiral conveyor 27 before they are sufficiently broken up to become small enough to be moved by the screw conveyor into and through the fluted tunnel.

I have obtained excellent results when the depth of the cut extends to the level of the valley bottom between adjacent spirals. Obviously, they could be made shallower or deeper.

It will be appreciated that an L-shaped cut in a conveyor spiral in the trough section provides, along the top side of the trough section, a nut-receiving opening which is larger than the opening between the conveyor and the wall of the trough section along the sides and bottom of the conveyor. Consequently, this L-shaped opening is operative to receive a nut at the top side of the conveyor and carry it toward said smaller opening for nut-cracking purposes. By nut-cracking purposes, I mean that the L-shaped cut will carry the nut toward said smaller opening and, in doing so, progressively compress and crack the nut against the trough wall or another nut or both.

It will be appreciated that I have provided an axially-aligned succession of L-shaped cuts contained in a corresponding succession of conveyor screw spirals in the trough section of the conveyor and that each cut has a tangential leg and a radial foot extending substantially within the radial plane of the corresponding portion of its spiral and that each cut opens forwardly in the direction in which the conveyor screw must rotate in order to be operative in the construction illustrated. Cuts of this character can all be made simultaneously in a simple machining operation.

Having described my invention, I claim:
1. A grinder for peanuts, coffee and the like, comprising:
   A. means providing a rear feeding chamber extending downwardly and terminating in a horizontal upwardly-open trough-like passageway having an outlet;
   B. means providing a front grinding chamber having an inlet and an outlet;
   C. a tunnel interconnecting the trough outlet with the grinding chamber inlet;
   D. a conveyor means extendng through the trough and tunnel and operative, when rotated in one direction, to convey the material to be ground into the grinding chamber inlet, said conveyor means including
      1. a spiral screw conveyor having sections corresponding to said trough and tunnel; and
   E. an axially-aligned succession of L-shaped cuts contained in a corresponding succession of conveyor screw spirals in the conveyor's trough section.
      1. each cut
         a. having a tangential leg and a radial foot.
         b. extending substantially within the radial plane of the corresponding portion of its spiral, and
         c. opening forwardly in said one direction of rotation.
2. The grinder of claim 1 wherein:
   A. the leg of the L extends tangentially to the conveyor at a level adjacent to the level of the valley bottom between adjacent spirals.
3. The grinder of claim 1 wherein:
   A. the foot of an L-shaped cut inclines forwardly in the direction of rotation to provide a pointed penetrating edge at its outer end.
4. The grinder of claim 3 including:
   A. a second axially-aligned succession of substantially identical L-shaped cuts formed in said spirals and spaced angularly from the first-mentioned series.

* * * * *